United States Patent
Takada

(10) Patent No.: US 12,066,739 B2
(45) Date of Patent: Aug. 20, 2024

(54) OPTICAL SCANNER

(71) Applicant: Topcon Corporation, Tokyo (JP)

(72) Inventor: Akira Takada, Tokyo (JP)

(73) Assignee: Topcon Corporation, Tokyo (JP)

( * ) Notice: Subject to any disclaimer, the term of this patent is extended or adjusted under 35 U.S.C. 154(b) by 215 days.

(21) Appl. No.: 17/456,380

(22) Filed: Nov. 24, 2021

(65) Prior Publication Data

US 2022/0171253 A1    Jun. 2, 2022

(30) Foreign Application Priority Data

Dec. 1, 2020 (JP) .................... 2020-199357

(51) Int. Cl.
*G02F 1/29* (2006.01)

(52) U.S. Cl.
CPC .................. *G02F 1/292* (2013.01)

(58) Field of Classification Search
CPC ............... G02F 1/292; G02F 2202/30
See application file for complete search history.

(56) References Cited

U.S. PATENT DOCUMENTS

| | | | |
|---|---|---|---|
| 2008/0239420 A1 | 10/2008 | McGrew | |
| 2009/0009838 A1* | 1/2009 | Masuda | G02B 27/4294 |
| | | | 359/558 |
| 2019/0301025 A1* | 10/2019 | Akselrod | G02B 1/002 |
| 2021/0405500 A1* | 12/2021 | Park | G01S 17/88 |

FOREIGN PATENT DOCUMENTS

| | | |
|---|---|---|
| JP | 2006154096 A | 6/2006 |
| JP | 2009014993 A | 1/2009 |
| JP | 2013076891 A | 4/2013 |

OTHER PUBLICATIONS

Notice of Reasons for Refusal mailed Jun. 11, 2024, in connection with Japanese Patent Application No. 2020-199357, 6 pgs. (including translation).

* cited by examiner

*Primary Examiner* — Jessica M Merlin
(74) *Attorney, Agent, or Firm* — Chiesa Shahinian & Giantomasi PC

(57) ABSTRACT

An optical scanner includes: a light source; a deflection element including a plurality of pixels arranged one-dimensionally or two-dimensionally; a one-cycle diffraction grating including, among the pixels, continuous N pixels, where N is a natural number of two or more; the one-cycle diffraction grating having a length d in the alignment direction that is smaller than a wavelength $\lambda$ of the light emitted from the light source; and a phase modulation controller configured to control a phase modulation amount of each of the pixels. Incident light is emitted from the light source obliquely from the reflecting surface at an incident angle $\theta_1$. Sin $\theta_i+(\lambda/d)>1$ or sin $\theta_i-(\lambda/d)>1$ is satisfied.

6 Claims, 10 Drawing Sheets

FIG.8

| HEIGHT h (nm) | PITCH p (nm) | GAP w (nm) | h/w | p/w | VALIDITY |
|---|---|---|---|---|---|
| 900 | 310 | 46.5 | 19.35 | 0.15 | VALID |
| 950 | 340 | 51 | 18.63 | 0.15 | |
| 950 | 370 | 55.5 | 17.12 | 0.15 | |
| 1000 | 380 | 57 | 17.54 | 0.15 | |
| 950 | 400 | 60 | 15.83 | 0.15 | |
| 1000 | 430 | 64.5 | 15.5 | 0.15 | |
| 1000 | 440 | 66 | 15.15 | 0.15 | |
| 1000 | 460 | 69 | 14.49 | 0.15 | |
| 1000 | 480 | 72 | 13.89 | 0.15 | |
| 600 | 490 | 49 | 12.24 | 0.1 | |
| 1000 | 490 | 73.5 | 13.61 | 0.15 | |
| 1000 | 520 | 78 | 12.82 | 0.15 | |
| 1000 | 550 | 82.5 | 12.12 | 0.15 | |
| 1000 | 580 | 87 | 11.49 | 0.15 | HIGH |

FIG.9
REFLECTED Hy DISTRIBUTION
TOTAL REFLECTIVITY: 66.7%
REFECTION EFFICIENCY FOR
        −1ST ORDER: 66.4%
NUMBER OF CELLS: THREE
NEGATIVE PHASE SLOPE
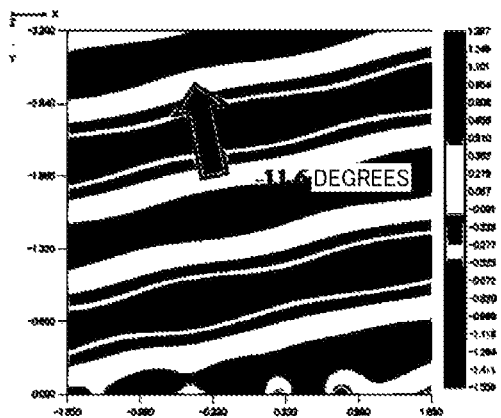
REFLECTED Hy DISTRIBUTION
TOTAL REFLECTIVITY: 73.0%
REFECTION EFFICIENCY FOR
        −1ST ORDER: 71.7%
NUMBER OF CELLS: TWO
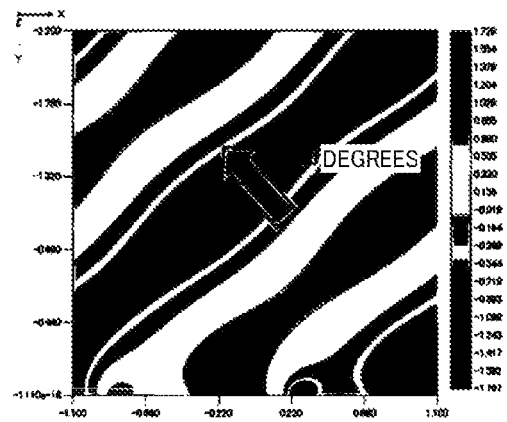

FIG.10
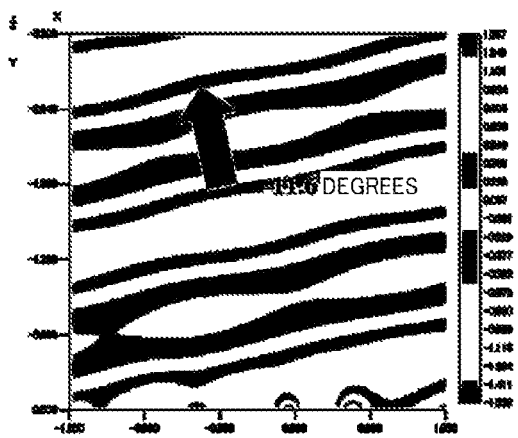
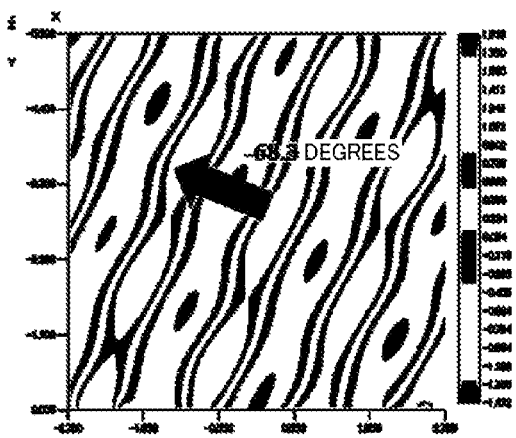

OPTICAL SCANNER

BACKGROUND

The present disclosure relates to an optical scanner.

In recent years, there have been significant technical developments for achieving autonomous vehicle driving. Among the techniques, obstacle detection using images, millimeter-wave radars, or LiDARs are focused on. LiDARs need to have distance and angle measurement functions. While LiDARs for angle measurement mainly employ a mechanical scanning system including a movable component such as a motor, a solid-state optical scanner without any movable part is expected for autonomous driving of a vehicle that causes vibrations during travel.

An element according to US Patent Publication No. 2019/0301025 is known which is applicable to a solid-state optical scanner, that is, which functions as a spatial phase modulation element.

SUMMARY

A solid-state optical scanner requires however a wider scanning range. That is, scanned beams need to have larger deflection angles.

In view of the foregoing, it is an objective of the present disclosure to provide an optical scanner, even a solid-state optical scanner, with a larger deflection angle and a wider scanning range.

An optical scanner according to an embodiment of the present disclosure is for deflecting light radiated from a light source at a predetermined deflection angle using a deflection element. The optical scanner includes: the light source; the deflection element including a plurality of pixels arranged one-dimensionally or two-dimensionally; each of the pixels including: a reflective layer made of metal, on a substrate; an insulating layer on the reflective layer; an electrode including a pair of metal poles of a first metal pole and a second metal pole extending perpendicularly from the insulating layer, the second metal pole being spaced apart from the first metal pole in an alignment direction; a gap between the first metal pole and the second metal pole; and a dielectric layer including a dielectric filling the gap and having a refractive index variable in accordance with an applied voltage; a one-cycle diffraction grating including, among the pixels, continuous N pixels, where N is a natural number of two or more by alternately arranging the electrode and the dielectric layer on a reflecting surface of the deflection element; the one diffraction grating cycle having a length d in the alignment direction that is smaller than a wavelength λ of the light emitted from the light source; and a phase modulation controller configured to control a phase modulation amount of each of the pixels by controlling a voltage V applied to the dielectric layer. Incident light is irradiated from the light source so as to be inclined from the reflecting surface at an incident angle $\theta_1$. Sin $\theta_i + (\lambda/d) > 1$ or sin $\theta_i - (\lambda/d) > 1$ is satisfied.

The present disclosure provides an optical scanner, even a solid-state optical scanner, with a larger deflection angle and a wider scanning range.

BRIEF DESCRIPTION OF THE DRAWINGS

FIG. 8 is a list of example pixels.

FIG. 9 is an illustration showing a result of analyzing the distribution of the magnetic field generated by a deflection element according to an example.

FIG. 10 is an illustration showing a result of analyzing the distribution of the magnetic field generated by a deflection element according to another example.

DETAILED DESCRIPTION

Now, an optical scanner according to an embodiment of the present disclosure will be described with reference to the drawings.

Figure 1:
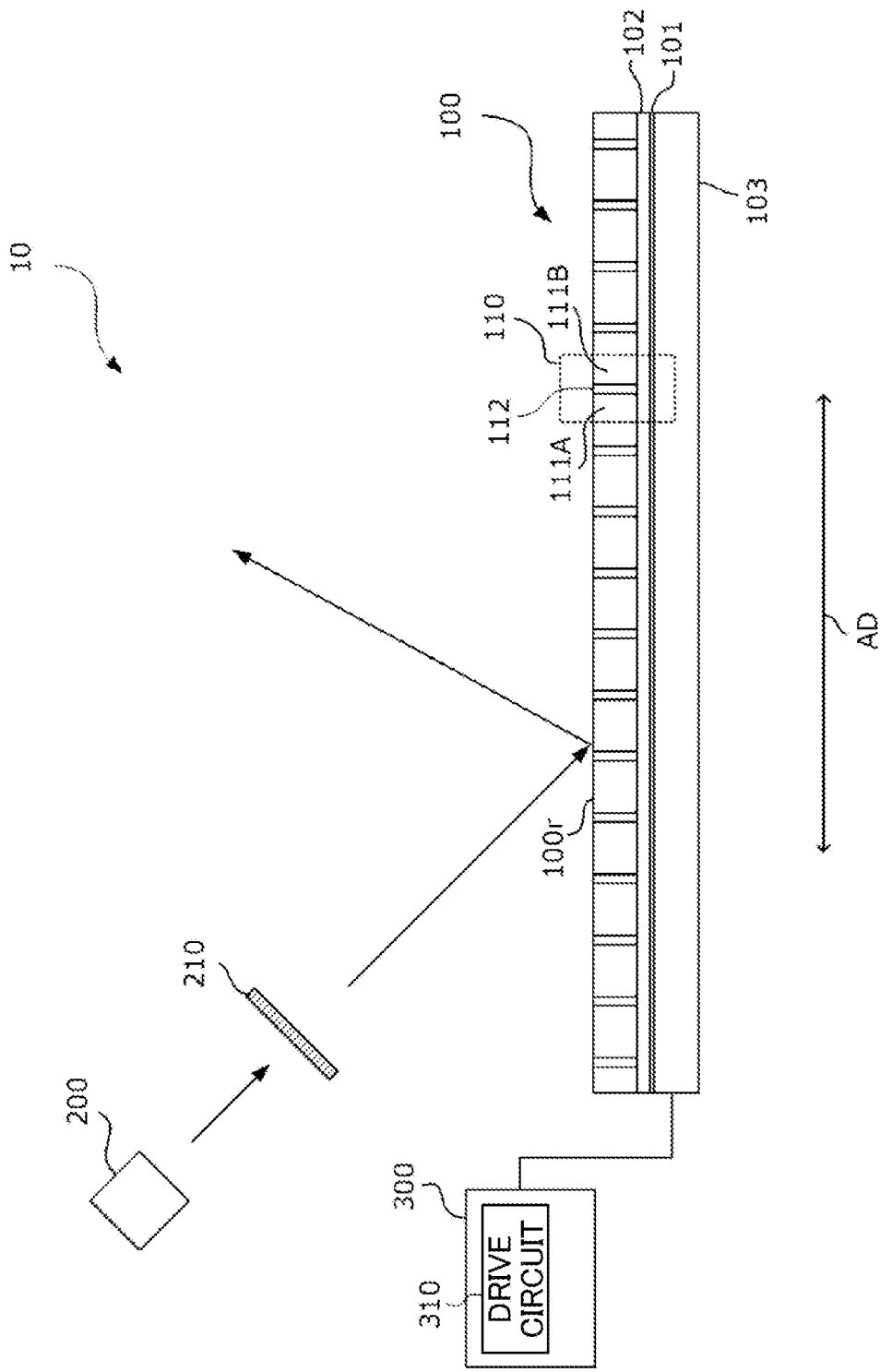
FIG. 1 is a view schematically showing a configuration of an optical scanner according to an embodiment.
Figure 2:
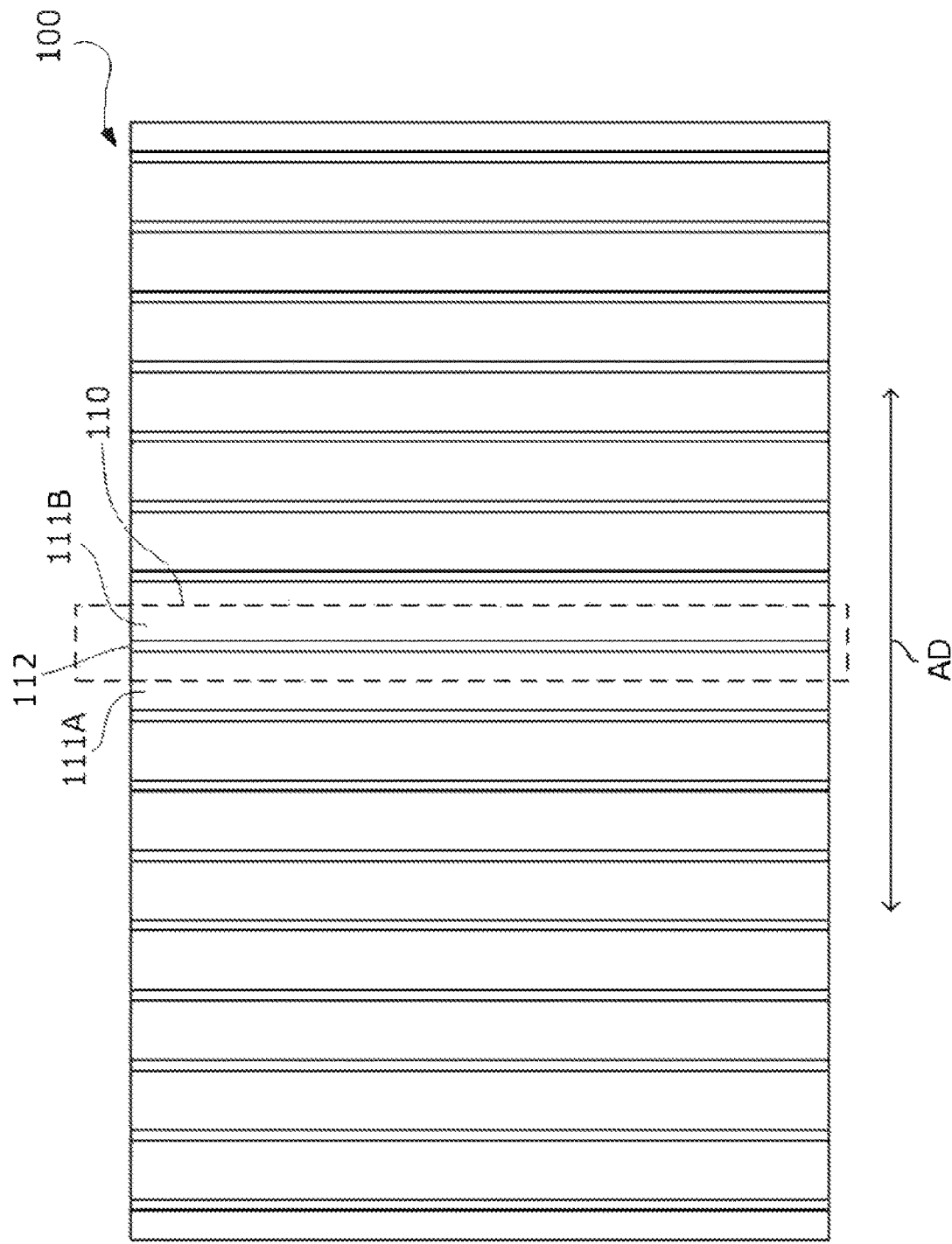
FIG. 2 is a top view of a reflecting surface of a deflection element of the optical scanner.
Figure 3:
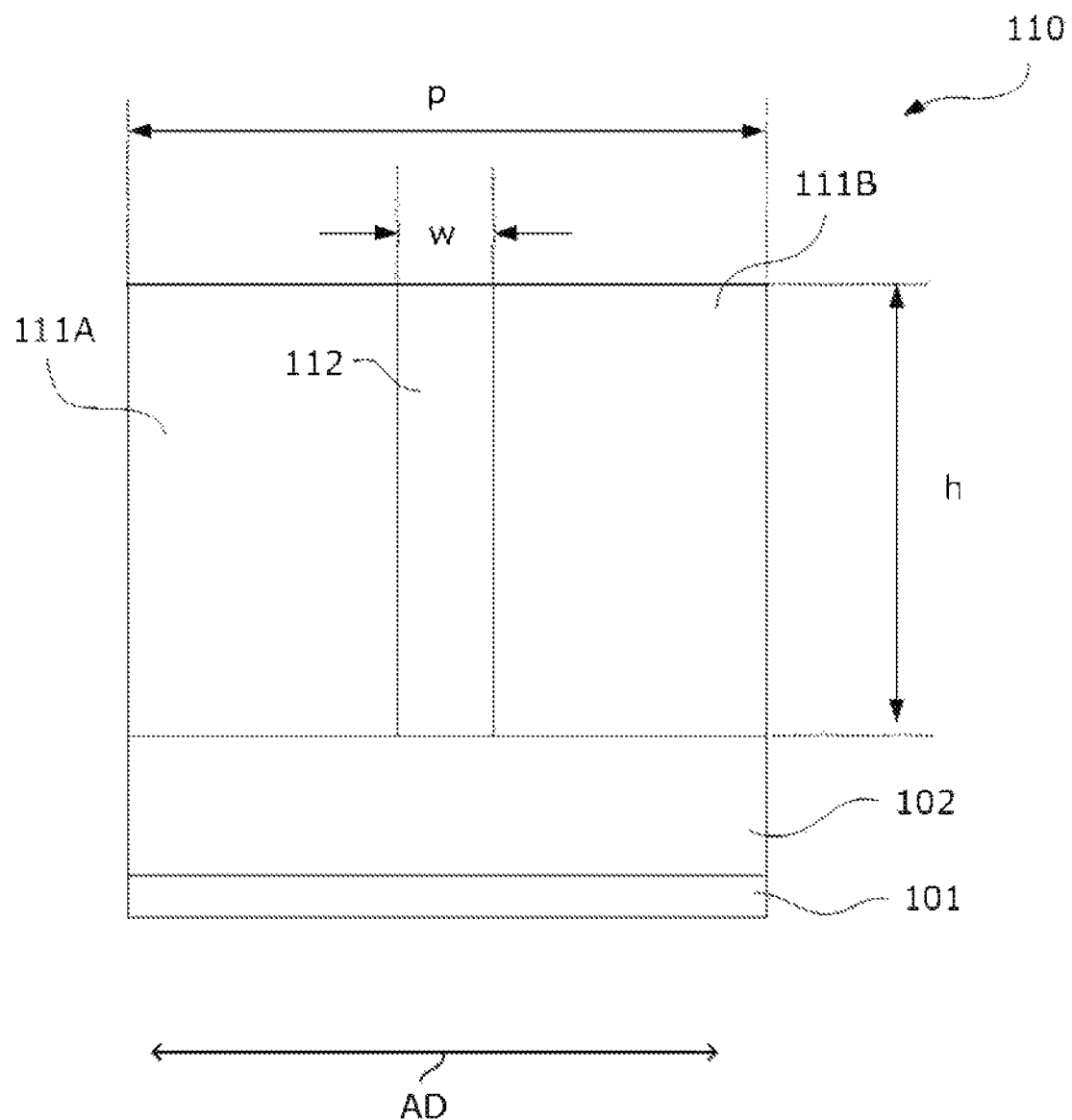
FIG. 3 is an illustration showing one of pixels constituting the deflection element.

FIG. 1 schematically shows a configuration of an optical scanner according to an embodiment of the present disclosure. FIG. 2 is a top view of a reflecting surface 100r of a deflection element 100 of an optical scanner 10. FIG. 3 illustrates one of pixels constituting the deflection element.

The optical scanner 10 may be used as a goniometer for autonomous driving of a vehicle, for example, and includes a light source 200, the deflection element 100, and a phase modulation controller 300. The light source 200 emits light. The deflection element 100 deflects, at a predetermined angle, the light emitted from the light source 200 onto the reflecting surface 100r of the deflection element 100. The phase modulation controller 300 controls the phase modulation amount for modulating the light emitted by the deflection element.

The light source 200 is a device that radiates coherent parallel light toward the deflection element 100 and is optically placed so that the light is obliquely incident on the reflecting surface 100r of the deflection element 100. The light source element of the light source 200 may be a laser element such as a semiconductor laser element. Note that the optical system, for example, for guiding the light from the light source 200 to the reflecting surface 100r is not shown. Although not shown, a predetermined power source and a predetermined controller adjust the output light.

The wavelength of the light emitted from the light source 200 may be as follows. For example, being suitable for detecting obstacles in autonomous driving of a vehicle, infrared light with a wavelength longer than visible light may be used. Near infrared light is used in one more preferred embodiment. Specifically, the light with a wavelength of 905 nm or a wavelength around 1.5 μm (e.g., 1.55 μm) may be used.

A polarizer 210 is an optical element for bringing the light radiated from the light source 200 into a predetermined polarized state. The polarizer 210 may be a wire grid polarizer as a light-transmissive polarizer. Such the polarizer 210 makes the light guided from the light source to be transverse-magnetic (TM) polarized.

The deflection element 100 includes a plurality of pixels 110 aligned one-dimensionally or two-dimensionally in an alignment direction AD. This figure shows a simulated cross-section parallel to the alignment direction and perpendicular to a substrate 103. The alignment direction AD is basically parallel to the substrate surface. A pixel 110 surrounded by a broken line includes, on the substrate 103 made of silicon (Si) crystal, a reflective layer 101, an insulating layer 102 on the reflective layer 101, an electrode 111 on the insulating layer 102, and a dielectric layer 112, for example. The electrode 111 includes a pair of metal poles.

The reflective layer 101 is made of silver (Ag), for example, and has a thickness of 100 nm, for example. The insulating layer 102 is made of silicon dioxide ($SiO_2$), for example, and has a thickness of 300 nm, for example.

As shown in FIGS. 1 and 2, the single pixel 110 surrounded by the broken line includes a first metal pole 111A continuous from an adjacent pixel. That is, this single pixel 110 is merely conceptual. As shown in FIGS. 1 and 2, the single pixel 110 actually includes electrodes 111 and dielectric layers 102 alternately in a cycle into a stripe pattern.

The first and second metal poles 111A and 111B are made of silver (Ag), for example. The dielectric filling the dielectric layer 112 is a liquid crystal material, for example.

FIG. 2 shows the deflection element 100 including the plurality of pixels 110 aligned one-dimensionally, as viewed directly above the reflecting surface 100r. The part surrounded by the broken line is the single pixel 110. In the one-dimensional deflection element 100, the electrodes are in the shape of rails.

As shown in FIG. 3, each pixel 110 includes, on the insulating layer 102, the electrode 111 including the pair of metal poles of the first and second metal poles 111A and 111B. The first metal pole 111A is spaced apart from the second metal pole 111B in the alignment direction. The gap between the first and second metal poles 111A and 111B is filled with the dielectric to serve as the dielectric layer 112.

Like FIG. 1, this FIG. 3 shows a simulated cross-section parallel to the alignment direction and perpendicular to the substrate 103. Here, a pitch n (nm) is the length of each single pixel 110. A height h (nm) is the height from the insulating layer to the reflecting surface 100r. The length w (nm) of the gap in the alignment direction is the width of the gap between the first and second metal poles 111A and 111B.

The specifications, more specifically, the sizes, of such the pixel 110 may be checked with various measuring means. For example, the shapes of the surfaces or cross sections can be checked using a scanning electron microscope or an atomic force microscope.

Each pixel 110 is what is called a "plasmonic metamaterial" including a nano-sized LC resonant circuit including metal and a dielectric, and having a great quality (Q) factor. The reflecting surface including such pixels 110 is called a "metasurface." In particular, the optical scanner 10 according to the embodiment of the present disclosure is a metascanner with a dynamic metasurface capable of controlling the phase modulation amount of each pixel to control the deflection angle of a beam.

The phase modulation controller 300 controls the voltage to be applied so that a drive circuit 310 electrically connected to the electrode 111 of each pixel 110 individually applies a predetermined voltage to the plurality of pixels. The phase modulation amount of the light incident on each pixel 110 is variable within a predetermined range by changing the voltage V applied to the dielectric filling the dielectric layer 112. For example, the dielectric may be a liquid crystal material. If liquid crystal is used as a dielectric, the orientation of the liquid crystal molecules changes in accordance with the applied voltage, and the refractive index changes within a predetermined range. Accordingly, the optical path length changes, which controls the phase modulation amount of the light incident on each pixel 110.

The first and second metal poles 111A and 111B of each pixel 110 functioning as a metamaterial, the gap between the poles, and the dielectric layer 112 have predetermined configurations to reduce the height of the pixel, utilizing the resonance phenomenon.

Figure 4:
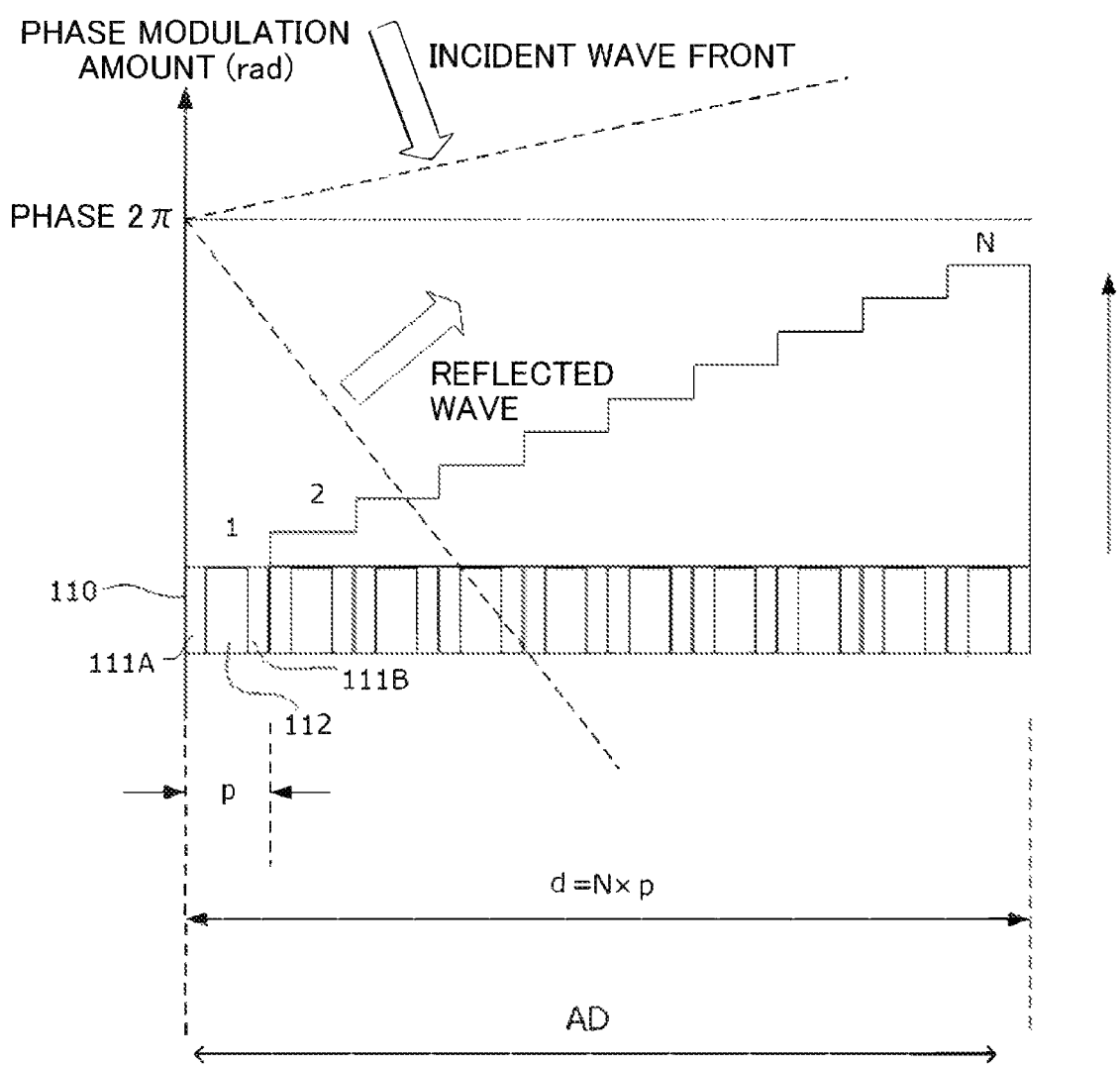
FIG. 4 is an illustration showing a diffraction grating including a plurality of pixels aligned in a cycle.

Used as a scanner (deflector), a spatial phase modulation element using pixels may act as a diffraction grating with a variable cycle. FIG. 4 illustrates a diffraction grating including a plurality of pixels 110 aligned in a cycle. In this figure, N pixels 110 are continuously arranged in an array into a one-cycle diffraction grating. Such one-cycle diffraction gratings may be aligned in the alignment direction.

In the diffraction grating including a plurality of pixels in an array adjusts the phase modulation amount of each pixel using the phase modulation controller 300 so that the total phase modulation amount within one cycle is $2\pi$ (rad), for example. The phase modulation amount of each pixel is determined by $2\pi/N \times$pixel number so that the phase modulation of each pixel is not continuous but discrete or stepwise. In this figure, the height of the step schematically represents the phase modulation amount. This figure shows a diffraction grating with the phase modulation amount as a positive slope. The phase modulation amount is controlled to increase with an increase in the distance from the light-incident point, that is, with an increase in the pixel number.

The length d of the once-cycle diffraction grating in the alignment direction AD is determined by the number N of pixels constituting one cycle and the pitch p of each pixel in the alignment direction, and expressed by the equation $d = N \times p$.

Figure 5:
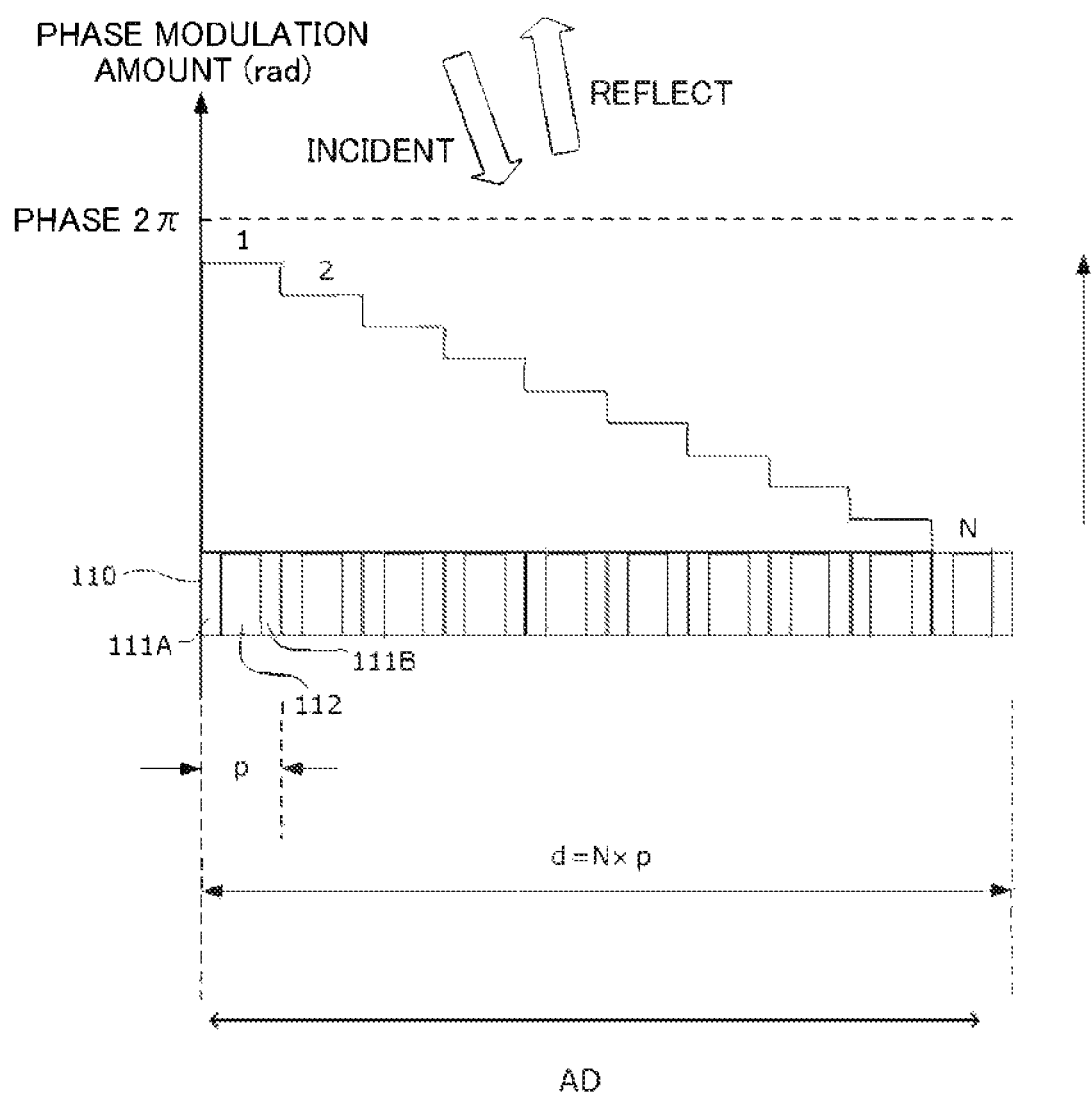
FIG. 5 is an illustration showing another diffraction grating including a plurality of pixels aligned in a cycle.

FIG. 5 illustrates a diffraction grating including a plurality of pixels 110 aligned in a cycle like FIG. 4, but shows the phase modulation amount as a negative slope. In this figure, the phase modulation amount increases with a decrease in the pixel number, and incident light is diffracted toward the incident point. With the use of the same deflection element 100 to control the voltage applied to each pixel of the phase modulation controller 300, the diffraction grating with the phase modulation amount as a negative slope is achieved.

Assume that the deflection element 100 includes a constant total number of pixels of in the alignment direction. With a decrease in the cycle span of the diffraction grating, the deflection (diffraction) angle increases, but the number N of pixels constituting one cycle decreases. This reduces the efficiency η in deflecting (diffracting) the light into desired light (e.g., +1st or −1st order diffracted light). For example, if N is two, where N pixels constitute one cycle and light is incident vertically, ±1st order diffracted light is generated.

A conceivable method of increasing the scanning range may be to decrease the pixel pitch or to increase the phase modulation amount. If the phase modulation amount is large, high-order diffracted light is utilized. Assume that a spatial phase modulator is made not of a metamaterial but of a natural material. Even utilizing a change in the refractive index by voltage application, the height h of the pixel electrode increases to obtain a necessary phase modulation amount, for example, $2\pi$. In view of the manufacturing process, such an increase in the height or the aspect ratio need to be reduced. However, a metascanner using pixels in a size smaller than the wavelength utilizes the resonance phenomenon to amplify the equivalent refractive index modulation amount. Since the Q value is high, the optical path length increases and the aspect ratio of each pixel less increases.

Figure 6:
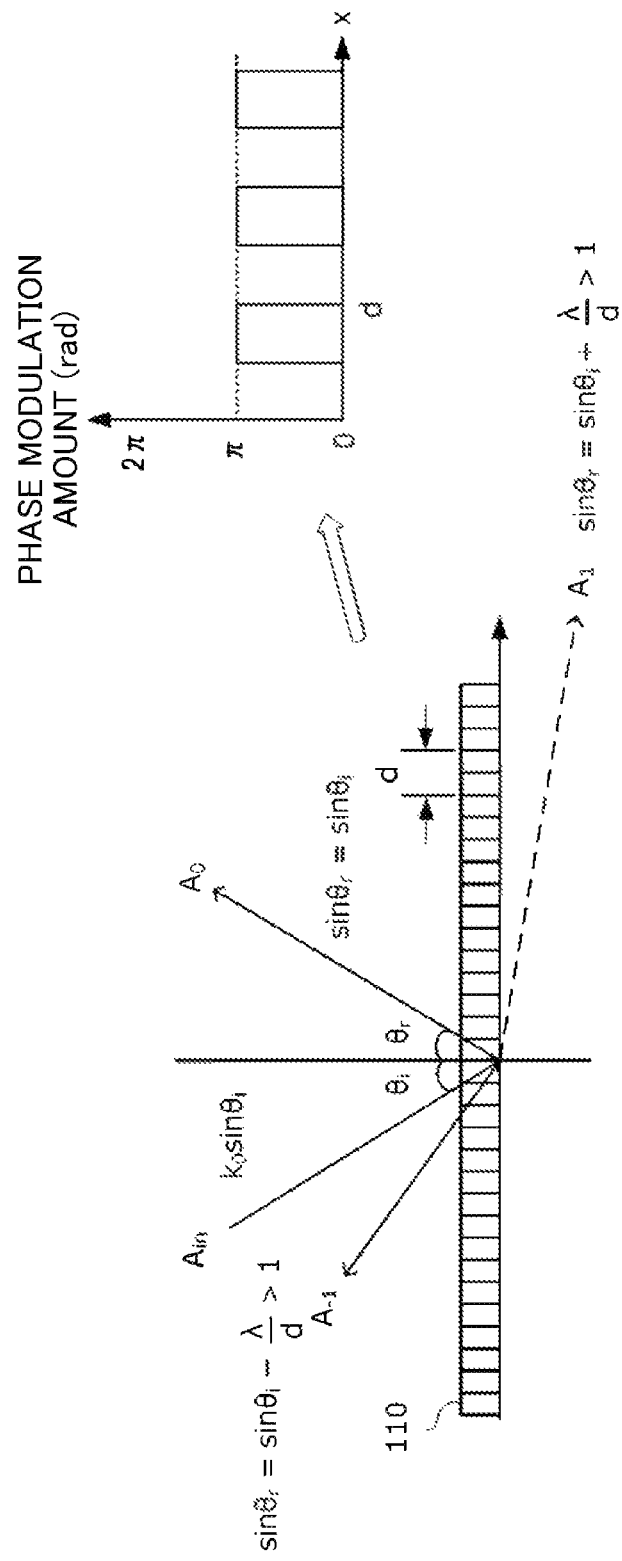
FIG. 6 is an illustration showing recombination of the evanescent light emitted from a diffraction grating including two pixels.

Now, generating high-order diffracted light utilizing evanescent light to increase the deflection angle will be described. FIG. 6 illustrates recombination of the evanescent light emitted from a diffraction grating including two pixels in one cycle. In this figure, each single pixel 110 has a pitch p of 550 nm, a wavelength of the light emitted from a light source is 1.55 μm, and an incident angle is 45°. Since one cycle includes two pixels (i.e., N=2), the phase modulation amounts of the pixels are 0 and π as shown in this figure, where the total phase modulation amount is 2π, for example.

Discussed here in this case is the reflected light that is incident light $A_{in}$ obliquely incident on the deflection element 100 at the incident angle $\theta_i$ and reflected at the reflection angle $\theta_r$. Here, $\sin \theta_r = \sin_i \pm m(\lambda/d)$ is discussed. In such a diffraction grating, +1st order diffracted light (m=+1) has $\sin \theta_r = \sin_i + m(\lambda/d) \approx 2.12 > 1$, since the wavelength λ is 1.55 μm and d is 550 nm×2. That is, such light with sin θ exceeding one is evanescent light. Diffracted light with $\sin \theta_r = \sin_i + (\lambda/d) > 1$ is the evanescent light which cannot propagate in space. On the other hand, the −1st order diffracted light has $\sin \theta_r = \sin_i - (\lambda/d) < 1$. At this time, only the −1st order diffracted light is generated to which the +1st order diffracted light that cannot propagate in space is combined.

Figure 7:
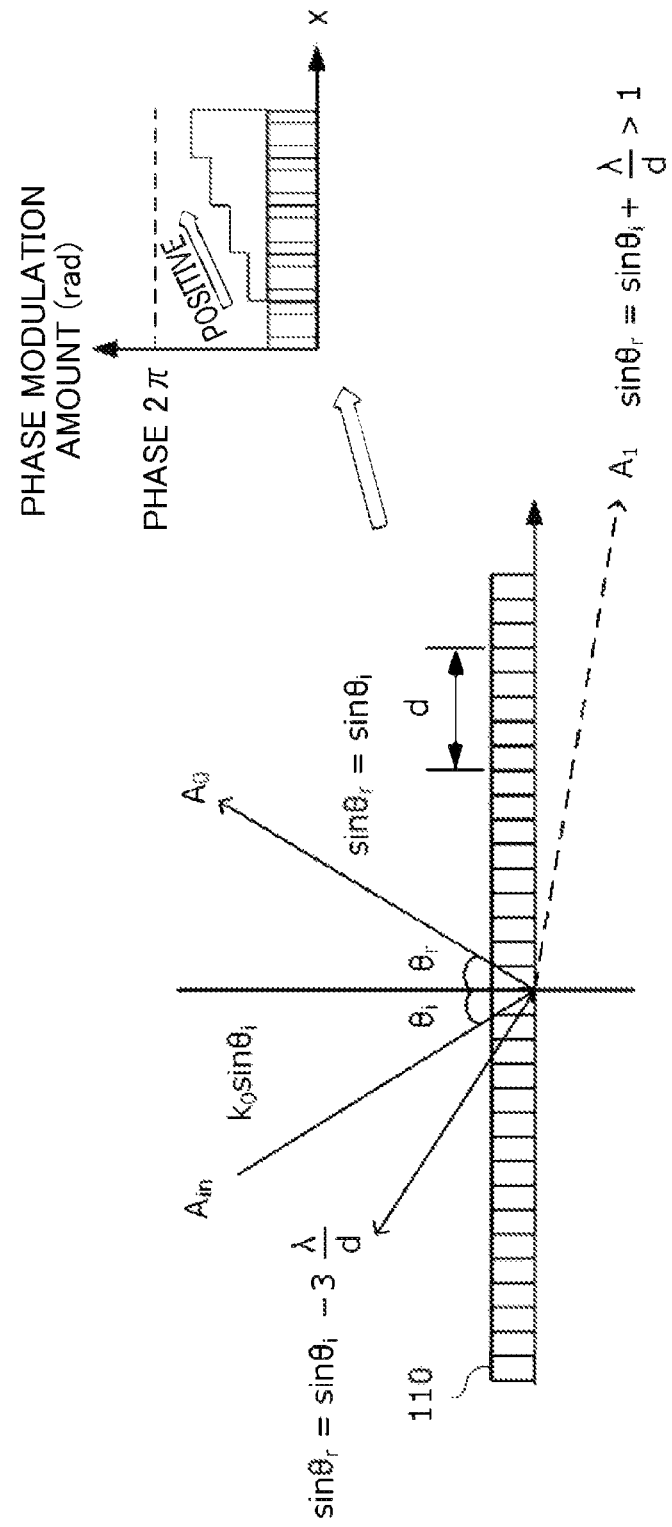
FIG. 7 is an illustration showing recombination of the evanescent light emitted from a diffraction grating including three or more pixels.

Similarly, a diffraction grating including three or more pixels in one cycle will be described. FIG. 7 illustrates recombination of the evanescent light emitted from a diffraction grating including five pixels in one cycle. In this figure as well, each single pixel 110 has a pitch p of 550 nm, the light emitted from a light source has a wavelength of 1.55 μm, and an incident angle is 45°. One cycle includes N pixels, where N is a natural number of three or more in this example, and N is five in this figure. The phase modulation amounts of the pixels with a positive phase slope are 0, 2π/5, 4π/5, 6π/5, and 8π/5, where the total phase modulation amount is 2π, for example.

Such a phase slope is positive. In a diffraction grating after the phase modulation for generating +1st order diffracted light (m=+1), the +1st order diffracted light has $\sin \theta_r = \sin_i + m(\lambda/d) \approx 1.27 > 1$, since the wavelength λ is 1.55 μm and d is 550 nm×5. Diffracted light with $\sin \theta_r = \sin_i + (\lambda/d) > 1$ is the evanescent light which cannot propagate in space. On the other hand, negative order diffracted light has $\sin \theta_r = \sin_i - m(\lambda/d) < 1$. At this time, negative high order diffracted light is generated. In this example, the −3rd order diffracted light (m=−3) is generated. Combined to this −3rd order diffracted light is the +1st order diffracted light that cannot propagate in space.

In this manner, evanescent light is generated when satisfying predetermined conditions to increase the deflection angle utilizing higher-order diffracted light, even if the phase modulation amount is limited to a predetermined amount (e.g., 2π).

To sum up, if the diffracted light with $\sin \theta_r = \sin \theta_i \pm m(\lambda/d) > 1$, at least the +1st order diffracted light is discussed, evanescent light is generated when satisfying the condition $\sin \theta_r = \sin \theta_i + (\lambda/d) > 1$ to increase the deflection angle. This is achieved by adjusting the wavelength λ of the light source, the incident angle $\theta_i$, and the length d of the one-cycle diffraction grating including N pixels, where N is a natural number of two or more, in the alignment direction. In addition, a deflector after the phase modulation for generating +1st order diffracted light generates evanescent light when satisfying the condition $\sin \theta_r = \sin \theta_i + (\lambda/d) > 1$. On the other hand, $\sin \theta_r = \sin \theta_i - m(\lambda/d) < 1$ is satisfied and −m-th order diffracted light is generated, which serves as the partner of recombination to increase the deflection angle. Similarly, a deflector after the phase modulation for generating −1st order diffracted light generates evanescent light when satisfying the condition $\sin \theta_r = \sin \theta_i - (\lambda/d) > 1$. On the other hand, $\sin \theta_r = \sin \theta_i + m(\lambda/d) < 1$ is satisfied and m-th order diffracted light is generated, which serves as the partner of recombination, to increase the deflection angle.

Assume that the pixel number n, where n is a natural number of N or less, is given to each pixel of the one-cycle diffraction grating in this case, and TPM (rad) is a predetermined total phase modulation amount. The phase modulation amount may be distributed into the pixels to increase or decrease stepwise by TPM/N in the alignment direction so that the phase modulation amount in a pixel with pixel number n is TPM×(n−1)/N, where n=1, 2, . . . n. The phase modulation according to this setting can be achieved by controlling the voltage applied to each electrode using the phase modulation controller 300.

In view of the aspect as a metascanner, the length d of the one-cycle diffraction grating in the alignment direction need to be at most smaller than the wavelength λ of the light emitted from the light source. In more preferred embodiment, d is smaller than λ/2. Further discussed is the case where the one-cycle diffraction grating includes N pixels, the pixel pitch p is smaller than λ/N, more preferably smaller than λ/2N.

FIG. 8 shows a list of sizes of the pixels 110 in one preferred embodiment. This figure shows the pitch n (nm), height h (nm), and length w (nm) of each pixel in which an increase in the deflection angle was confirmed in a test using the deflection element 100. As shown in FIG. 3, the pitch n (nm) is the length of each single pixel 110 in the alignment direction. The height h (nm) is the height from the insulating layer to the reflecting surface 100r. The length w (nm) of the gap in the alignment direction is the width of the gap between the first and second metal poles 111A and 111B.

More specifically, as shown in FIG. 8, the electrode has a height h ranging from 600 nm to 1000 nm. The electrode with a height within the range is sufficiently manufacturable by an existing technique.

The gap has a length w of 100 nm or less, specifically ranging from 46.5 nm to 87 nm in the alignment direction.

Each single pixel has a pitch p ranging from 310 nm to 580 nm in the alignment direction. The relationship between p and w, that is, p/w ranges from 0.1 to 0.15, where the pitch p falls within this range.

The relationship between the length w of the gap in the alignment direction and the height h of the electrode, that is, h/w ranges from 11:49 to 19.35. In this relationship, a smaller h/w ratio means easier manufacturing and a higher validity.

The used light source 200 emits light with a wavelength of 1.55 μm at an incident angle of 45°. The reflective layer 101 is made of silver (Ag), whereas the insulating layer 102 is made of silicon dioxide ($SiO_2$). The dielectric filling the dielectric layer 112 is a liquid crystal material. Such the pixel 110 is sufficiently manufacturable by applying an existing nanoimprint technique or a process of manufacturing a complementary metal-oxide semiconductor (CMOS) element.

An example will be described where the deflection angle increases, utilizing recombination of evanescent light. FIG. 9 shows a result of analyzing a simulated distribution of the magnetic field after phase modulation, by the deflection element 100 which has been described with reference to FIG. 6. The conditions for this analysis are the same as in the description of FIG. 6. The left shows a comparative example where no evanescent light is generated, the phase modulation is performed to generate −1st order diffracted light, and the pixel number N is three. The deflection angle in this comparative example was −11.6°. On the other hand, the right shows an example where evanescent light is generated, and the pixel number N is two. The deflection angle in this example increased to −41.0° utilizing the −1st order diffracted light.

FIG. 10 shows a result of analyzing a simulated distribution of the magnetic field, after phase modulation by the deflection element 100 which has been described with reference to FIG. 7. The left shows a comparative example where no evanescent light is generated, the phase modulation is performed to generate −1st order diffracted light, and the pixel number N is three. The deflection angle in this comparative example was −11.6°. On the other hand, the right shows an example where evanescent light is generated, the phase modulation is performed to generate +1st order diffracted light, and the pixel number N is five. The deflection angle in this example increased to −68.3° utilizing the −3rd order diffracted light.

In this manner, the predetermined conditions for generating evanescent light are satisfied to generate higher-order diffracted light in the direction opposite to the phase modulation direction, thereby increasing the deflection angle.

As described above, the optical scanner 10 according to the embodiment of the present disclosure is for deflecting the light radiated from the light source 200 at the predetermined deflection angle using the deflection element 100. The optical scanner 10 includes: the light source 200; the deflection element 100; the deflection element 100 including the plurality of pixels 110 aligned one-dimensionally or two-dimensionally; each of the pixels including: the reflective layer 101 made of metal, on a substrate; the insulating layer 102 on the reflective layer; the electrode 111 including the pair of metal poles of the first metal pole 111A and the second metal pole 111B extending perpendicularly from the insulating layer, the second metal pole being spaced apart from the first metal pole in the alignment direction; the gap between the first metal pole and the second metal pole; and the dielectric layer 112 including the dielectric filling the gap and having the refractive index variable in accordance with an applied voltage; the one-cycle diffraction grating including, among the pixels 110, continuous N pixels, where N is a natural number of two or more, by alternately arranging the electrode and the dielectric layer on the reflecting surface of the deflection element 100; the one-cycle diffraction grating having, in the alignment direction, the length d smaller than the wavelength $\lambda$ of the light emitted from the light source 200; and the phase modulation controller 300 configured to control the phase modulation amount of each of the pixels by controlling the voltage V applied to the dielectric layer 112. The light source 200 irradiates the reflecting surface with the incident light obliquely at an incident angle $\theta_i$. Sin $\theta_i+(\lambda/d)>1$ or sin $\theta_i-(\lambda/d)>1$ is satisfied. Accordingly, even in the solid-state optical scanner 10 using a metasurface, evanescent light that cannot propagate is combined with higher-order diffracted light to provide a larger deflection angle and a wider scanning range.

The gap has a length w of 100 nm or less in the alignment direction. This configuration provides a higher Q value, further increases the deflection angle while reducing the height h of the electrode, and further increases the scanning range, even in a solid-state optical scanner using a metasurface.

The pitch p of each single pixel in the alignment direction ranges from 310 nm to 580 nm. The ratio p/w ranges from 0.1 to 0.15. This configuration increases the deflection angle, decreases the absorption loss of the electrode, and increases the scanning range, while providing a higher Q factor, even in a solid-state optical scanner using a metasurface.

The electrode with a height h ranging from 600 nm to 1000 nm is sufficiently manufacturable by an existing technique.

The ratio of the length w of the gap in the alignment direction to the height h of the electrode ranges from 1:11 to 1:19. This allows even a solid-state optical scanner using a metasurface to have a larger deflection angle and a wider scanning range.

The phase modulation controller 300 causes the phase modulation amount of each of the pixels constituting the one-cycle diffraction grating to increase or decrease in the alignment direction by TPM/N, where TPM (rad) is a predetermined total phase modulation amount. This configuration allows adjustment to a desired cycle, adjustment of the deflection angle, and control of the reflected wave front, and provides a desired diffraction grating.

A dielectric being a liquid crystal material changes the refractive index within a relatively wide range.

The embodiment of the present disclosure has been described above. The aspects of the present disclosure are however not limited to the embodiment described above.

DESCRIPTION OF REFERENCE CHARACTERS

10 Optical Scanner
100 Deflection Element
101 Reflective Layer
102 Insulating Layer
103 Substrate
110 Pixel
111 Electrode
111A First Metal Pole
111B Second Metal Pole
112 Dielectric Layer
200 Light Source
210 Polarizer
300 Phase Modulation Controller
310 Drive Circuit

What is claimed is:

1. An optical scanner for deflecting light radiated from a light source at a predetermined deflection angle using a deflection element, the optical scanner comprising:
the light source;
the deflection element including a plurality of pixels arranged one-dimensionally or two-dimensionally;
each of the pixels including:
a reflective layer made of metal, on a substrate;
an insulating layer on the reflective layer;
an electrode including a pair of metal poles of a first metal pole and a second metal pole extending perpendicularly from the insulating layer, the second metal pole being spaced apart from the first metal pole in an alignment direction;
a gap between the first metal pole and the second metal pole; and
a dielectric layer including a dielectric filling the gap and having a refractive index variable in accordance with an applied voltage;
a one-cycle diffraction grating including, among the pixels, continuous N pixels, where N is a natural number of two or more, by alternately arranging the electrode and the dielectric layer on a reflecting surface of the deflection element;

the one-cycle diffraction grating having, in the alignment direction, a length d that is smaller than a wavelength $\lambda$ of the light emitted from the light source; and a phase modulation controller configured to control a phase modulation amount of each of the pixels by controlling a voltage V applied to the dielectric layer, wherein the light source irradiates the reflecting surface with incident light obliquely at an incident angle $\theta_i$, $\sin \theta_i + (\lambda/d) > 1$ or $\sin \theta_i - (\lambda/d) > 1$ is satisfied, wherein the phase modulation controller causes the phase modulation amount of each of the N pixels constituting the one-cycle diffraction grating to increase or decrease in the alignment direction by TPM/N, where TPM (rad) is a predetermined total phase modulation amount.

2. The optical scanner of claim 1, wherein the gap has a length w of 100 nm or less in the alignment direction.

3. The optical scanner of claim 1, wherein each of the pixels has a pitch p ranging from 310 nm to 580 nm in the alignment direction, and p/w ranges from 0.1 to 0.15.

4. The optical scanner of claim 1, wherein the electrode has a height h ranging from 600 nm to 1000 nm.

5. The optical scanner of claim 1, wherein a ratio of the length w of the gap in the alignment direction to a height h of the electrode ranges from 1:11 to 1:19.

6. The optical scanner of claim 1, wherein the dielectric is a liquid crystal material.

\* \* \* \* \*

UNITED STATES PATENT AND TRADEMARK OFFICE
CERTIFICATE OF CORRECTION

| | | |
|---|---|---|
| PATENT NO. | : 12,066,739 B2 | Page 1 of 1 |
| APPLICATION NO. | : 17/456380 | |
| DATED | : August 20, 2024 | |
| INVENTOR(S) | : Akira Takada | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 275 days.

Signed and Sealed this
Thirty-first Day of December, 2024

Derrick Brent
*Acting Director of the United States Patent and Trademark Office*